United States Patent
Takano et al.

(10) Patent No.: US 9,103,378 B2
(45) Date of Patent: Aug. 11, 2015

(54) BEARING, LUBRICANT DISTRIBUTION ACQUISITION DEVICE AND LUBRICANT DISTRIBUTION ACQUISITION METHOD

(75) Inventors: Takehisa Takano, Tokyo (JP); Hiroyuki Nose, Tokyo (JP); Akira Ito, Tokyo (JP)

(73) Assignee: IHI CORPORATION (JP)

( * ) Notice: Subject to any disclaimer, the term of this patent is extended or adjusted under 35 U.S.C. 154(b) by 66 days.

(21) Appl. No.: 14/002,783

(22) PCT Filed: Mar. 9, 2012

(86) PCT No.: PCT/JP2012/056164
§ 371 (c)(1),
(2), (4) Date: Sep. 3, 2013

(87) PCT Pub. No.: WO2012/121384
PCT Pub. Date: Sep. 13, 2012

(65) Prior Publication Data
US 2013/0343633 A1    Dec. 26, 2013

(30) Foreign Application Priority Data
Mar. 10, 2011  (JP) .................................. 2011-053439

(51) Int. Cl.
| | | |
|---|---|---|
| *G01N 23/05* | (2006.01) | |
| *F16C 41/00* | (2006.01) | |
| *F16C 33/66* | (2006.01) | |
| *G01M 13/04* | (2006.01) | |
| *F16C 33/62* | (2006.01) | |

(52) U.S. Cl.
CPC ........... *F16C 41/008* (2013.01); *F16C 33/6625* (2013.01); *F16C 41/007* (2013.01); *G01M 13/04* (2013.01); *F16C 33/62* (2013.01); *F16C 2204/20* (2013.01); *F16C 2233/00* (2013.01)

(58) Field of Classification Search
CPC ............................... G01N 23/05; G01N 13/04
USPC ..................................................... 250/390.01
See application file for complete search history.

(56) References Cited

U.S. PATENT DOCUMENTS

| | | | | |
|---|---|---|---|---|
| 4,152,598 | A | * | 5/1979 | Stewart .......................... 250/391 |
| 5,859,426 | A | * | 1/1999 | Audagnotto et al. ..... 250/231.13 |
| 2004/0028304 | A1* | | 2/2004 | Landrieve ...................... 384/448 |
| 2005/0031239 | A1* | | 2/2005 | Aoki et al. .................... 384/448 |

(Continued)

FOREIGN PATENT DOCUMENTS

| | | |
|---|---|---|
| EP | 1 447 579 A1 | 8/2004 |
| FR | 2 856 757 A1 | 12/2004 |

(Continued)

OTHER PUBLICATIONS

John T. Lindsay and Peter Schoch, "X-ray vision on steroids," Machine Design, vol. 70, No. 6, pp. 49-51, Apr. 1998.*

(Continued)

*Primary Examiner* — Marcus Taningco
(74) *Attorney, Agent, or Firm* — Ostrolenk Faber LLP

(57) ABSTRACT

A bearing (X) inside which a lubricant is able to be sealed is provided with: a rotary motion body (X2) that moves when a rotation drive force is applied; and a rotation angle indicator (X6) that is provided on the rotary motion body (X2) and that is moved, in conjunction with the movement of the rotary motion body (X2), to a position that corresponds to the rotation angle of the rotary motion body (X2).

13 Claims, 4 Drawing Sheets

(56) References Cited

U.S. PATENT DOCUMENTS

| | | | |
|---|---|---|---|
| 2006/0039639 A1* | 2/2006 | Aoki et al. | 384/448 |
| 2007/0053622 A1 | 3/2007 | Gallion et al. | |
| 2009/0058403 A1 | 3/2009 | Tomioka | |
| 2009/0103847 A1* | 4/2009 | Ishikawa et al. | 384/544 |
| 2010/0172605 A1* | 7/2010 | Pausch et al. | 384/446 |
| 2010/0180664 A1* | 7/2010 | Wilhelmy et al. | 73/7 |

FOREIGN PATENT DOCUMENTS

| | | |
|---|---|---|
| JP | A-07-218248 | 8/1995 |
| JP | A-10-274546 | 10/1998 |
| JP | 2000-088600 | 3/2000 |
| JP | 2000-292373 | 10/2000 |
| JP | A-2003-322547 | 11/2003 |
| JP | 2004-053589 | 2/2004 |
| JP | A-2007-248325 | 9/2007 |
| JP | 2008-196938 | 8/2008 |
| JP | 2010-054500 | 3/2010 |
| JP | 2011-038557 | 2/2011 |

OTHER PUBLICATIONS

Extended European Search Report dated Sep. 12, 2014 in corresponding European Patent Application No. EP12755626.4 (English language)(7 pages).

P. B. Scott, et al., "Neutron Radiographs Using the Ionographic Process," J. Applied Physics, vol. 49, No. 10, Oct. 1, 1978, pp. 5078-5080.

J. A. Reuscher, et al., "Real-Time Neutron Radiography at Texas A & M University," Nuclear Instruments and Methods in Physics Research Section A, Elsevier Science Publishers B.V., vol. A299, No. 1/3, Dec. 20, 1990, pp. 434-439.

International Search Report mailed May 29, 2012 in corresponding PCT International Application No. PCT/JP2012/056164.

* cited by examiner

BEARING, LUBRICANT DISTRIBUTION ACQUISITION DEVICE AND LUBRICANT DISTRIBUTION ACQUISITION METHOD

CROSS-REFERENCE TO RELATED APPLICATIONS

The present application is a 35 U.S.C. §§371 national phase conversion of PCT/JP2012/056164, filed Mar. 9, 2012, which claims priority to Japanese Patent Application No. 2011-053439, filed Mar. 10, 2011, the contents of which are incorporated herein by reference. The PCT International Application was published in the Japanese language.

FIELD OF THE INVENTION

The present invention relates to a bearing, a lubricant distribution acquisition device and a lubricant distribution acquisition method.

BACKGROUND ART

For example, in Patent document 1, an invention is disclosed that uses neutron radiography to examine whether or not a lubricant is present inside a hydrodynamic bearing.

By using the invention disclosed in Patent Document 1, without dismantling the bearing it is possible to perform an examination to determine whether or not a lubricant is present which hitherto has required the bearing to be dismantled.

RELATED ART DOCUMENTS

Patent Documents

[Patent Document 1] Japanese Patent Application, First Publication No. 2000-292373

DISCLOSURE OF THE INVENTION

Problems to be Solved by the Invention

In order to ascertain the behavior of a lubricant in more detail, users have demanded the ability to acquire an accurate three-dimensional distribution of the lubricant. However, the invention disclosed in Patent Document 1 only examines whether or not a lubricant is present, and does not detect the behavior of the lubricant. As a consequence, in Patent Document 1, no consideration is given to acquiring images of the bearing simultaneously from a plurality of directions.

Moreover, because neutron beam sources that are used in neutron radiography are generally formed by atomic reactors or accelerators, installing these in a plurality of locations is extremely problematic.

Because of this, when images of a bearing are to be acquired from a plurality of directions, the bearing itself is rotated so as to change the direction in which the bearing is facing. Naturally, the imaging timings of the resulting plurality of sets of imaging data are chronologically different from each other.

In order to acquire a three-dimensional distribution of a lubricant, it is necessary to combine together sets of imaging data that were acquired when the rotation angle of the bearing was in the same state.

However, in the invention disclosed in Patent Document 1, as is described above, the behavior of the lubricant is not detected. Therefore, in the invention disclosed in Patent Document 1, it is not possible to ascertain the rotation angle of the bearing from the acquired imaging data, and it is extremely difficult to combine together a plurality of sets of imaging data that were acquired at chronologically different timings.

An aspect of the present invention was conceived in view of the above-described problem points, and it is an object thereof to provide a bearing, a lubricant distribution acquisition device and a lubricant distribution acquisition method that make it possible to easily combine together sets of imaging data that were acquired when the rotation angle of a bearing was in the same state from among sets of imaging data that were acquired at chronologically different timings, and that thereby make it possible to accurately ascertain the behavior of a lubricant inside the bearing.

Means for Solving the Problems

The applicants for the present invention conducted research into the relationship between the behavior of a lubricant inside a bearing and the lifespan of the bearing. As a result, they discovered that individual differences existed between the lifespans of different bearings even when the environment and the like in which they were used were the same. The applicants for the present invention also dismantled and examined these bearings having different lifespans. As a result, they found that there were considerable differences in the state of the lubricant present inside them. In a roller bearing, in particular, they found that the behavior of the lubricant inside the bearing had a huge effect on the lifespan.

These results suggest that the lifespan of a bearing depends on the behavior of the lubricant inside it. Namely, if the behavior of the lubricant inside a bearing can be ascertained, then there is a possibility that the lifespan of the bearing may be able to be improved.

Based on these research results, a first aspect of the present invention employs a constitution in which a bearing inside which a lubricant is able to be sealed is provided with: a rotary motion body that moves when a rotation drive force is applied; and a rotation angle indicator that is provided on the rotary motion body and that is moved, in conjunction with the movement of the rotary motion body, to a position that corresponds to the rotation angle of the rotary motion body.

A second aspect of the present invention is according to the above-described first aspect of the present invention and wherein a constitution is employed in which both the position of the rotation angle indicator as seen from the axial direction of the bearing, and the position of the rotation angle indicator as seen from an orthogonal direction relative to the axial direction move in accordance with the rotation angle of the rotary motion body.

A third aspect of the present invention is according to the above-described second aspect of the present invention and wherein a constitution is employed in which the rotation angle indicator is formed by a first marker and a second marker that are formed from a material having a higher rate of radiation beam absorption than that used to form the rotary motion body, and the first marker and the second marker are placed opposite each other when viewed from the axial direction around the center of movement of the rotary motion body, and are offset relative to each other in the axial direction when viewed from an orthogonal direction relative to the axial direction.

A fourth aspect of the present invention is according to the above-described third aspect of the present invention and wherein a constitution is employed in which the rotation angle indicator is further provided with a third marker that is formed from a material having a higher rate of radiation beam absorption than that used to form the rotary motion body, and the third marker is offset in the axial direction relative to the first marker and the second marker when viewed from an orthogonal direction relative to the axial direction.

A fifth aspect of the present invention is according to the above-described fourth aspect of the present invention and wherein a constitution is employed in which the third marker is placed in a position that is offset by a predetermined angle around the center of movement of the rotary motion body relative to the first marker or the second marker when viewed from the axial direction.

A sixth aspect of the present invention is according to the above-described fifth aspect of the present invention and wherein a constitution is employed in which the predetermined angle is 45°.

A seventh aspect of the present invention is a lubricant distribution acquisition device wherein a constitution is employed in which there are provided an electromagnetic wave converting device that receives radiation beams that have been transmitted through the bearing described in any one of the above-described first through sixth aspects of the invention, and converts these into electromagnetic waves; and an imaging processing means that, by receiving the electromagnetic waves emitted from the electromagnetic wave converting device and using these electromagnetic waves to form images, acquires lubricant distribution data that shows the distribution of a lubricant inside the bearing.

An eighth aspect of the present invention is a lubricant distribution acquisition method wherein a constitution is employed in which radiation beams that have been transmitted through the bearing described in any one of the above-described first through sixth aspects of the invention are converted into electromagnetic waves, and lubricant distribution data that shows the distribution of a lubricant inside the bearing is acquired by receiving the electromagnetic waves and using them to form images.

A ninth aspect of the present invention is any one of the above-described third through eighth aspects of the present invention wherein a constitution is employed in which the radiation beams are neutron beams.

Effects of the Invention

The bearing of the present invention is provided with a rotary motion body that is moved when it is driven to rotate. Because the rotary motion body is moved in conjunction with the rotational drive of the bearing, the rotation angle of the rotary motion body is synchronized with the rotation angle of the bearing. As a consequence, by combining together sets of imaging data that were acquired with the rotation angle of the rotary motion body in the same state, sets of imaging data that were acquired with the rotation angle of the bearing in the same state are also combined together.

In addition, in the bearing of the present invention, a rotation angle indicator that is moved in conjunction with the movement of the rotary motion body to a position that corresponds to the rotation angle of the rotary motion body is provided on the rotary motion body. Therefore, by combining together sets of imaging data in which the position of the rotation angle indicator is the same, it is possible to combine together sets of imaging data that were acquired when the rotation angle of the rotary motion body (namely, the bearing) was in the same state even if the imaging timings of the plurality of sets of imaging data are chronologically different.

Accordingly, according to the present invention it is possible to accurately ascertain the behavior of a lubricant inside a bearing.

Note that in the present invention, a rotation angle indicator is provided on the rotary motion body. Because of this, even if there are temporary irregularities in the rotation speed of the bearing, or if there are changes due to elapsed time, it is still possible to accurately ascertain the rotation angle of the rotary motion body. As a result, it is possible to reliably combine together sets of imaging data that were acquired when the rotation angle of the rotary motion body (namely, the bearing) was in the same state.

EMBODIMENTS FOR CARRYING OUT THE INVENTION

An embodiment of the bearing, lubricant distribution acquisition device, and lubricant distribution acquisition method of the present invention will now be described with reference made to the drawings. Note that in the following drawings, the scale of each component has been suitably altered in order to make each component a recognizable size.

Figure 1A:
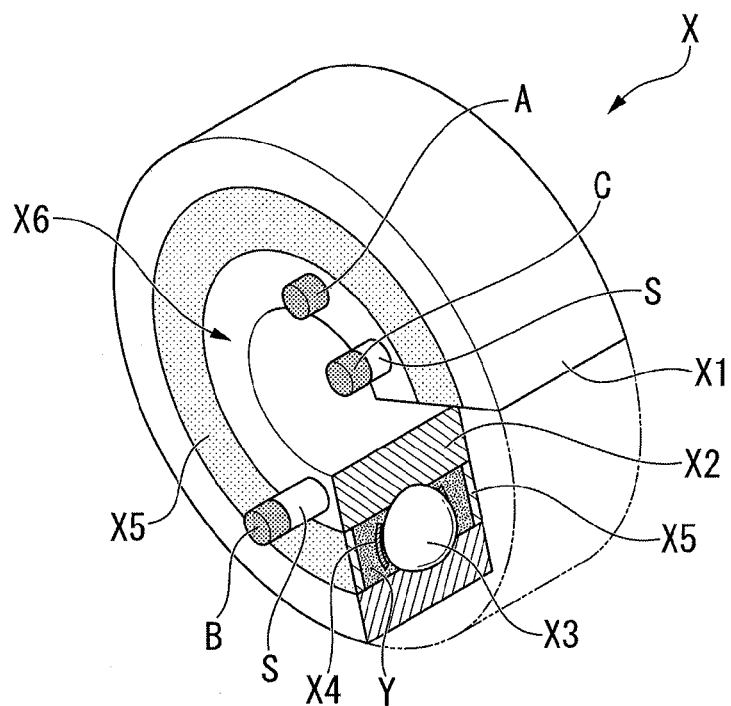
FIG. 1A is a schematic structural view of a bearing according to an embodiment of the present invention, and is a perspective view of a cutaway model.
Figure 1B:
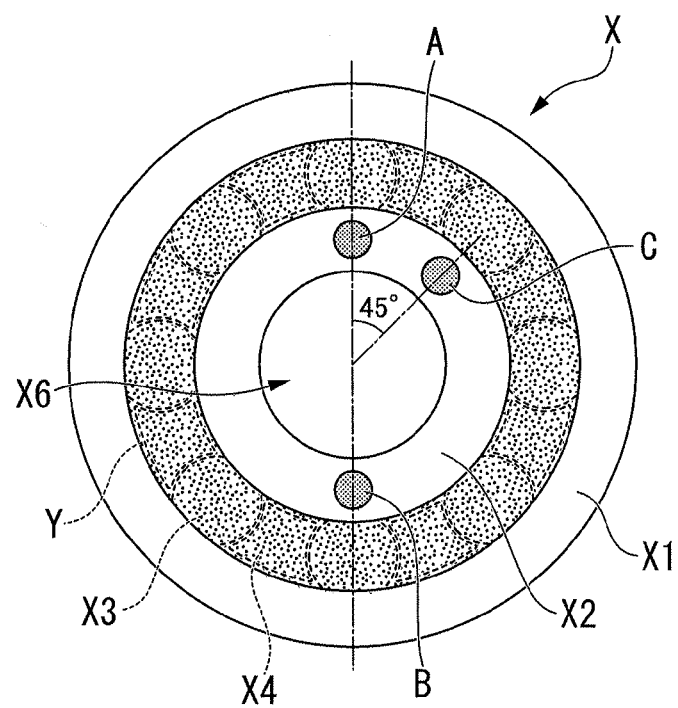
FIG. 1B is a schematic structural view of a bearing according to an embodiment of the present invention, and is a frontal view looking from an axial direction.
Figure 1C:
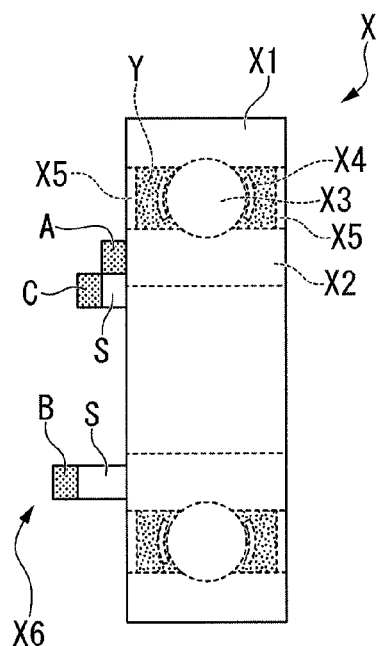
FIG. 1C is a schematic structural view of a bearing according to an embodiment of the present invention, and is a side view looking from an orthogonal direction relative to the axial direction.

FIGS. 1A to 1C are schematic structural views of a bearing X of the present embodiment. FIG. 1A is a perspective view of a cutaway model. FIG. 1B is a frontal view looking from an axial direction. FIG. 1C is a side view looking from an orthogonal direction relative to the axial direction.

The bearing X of the present embodiment is a ball bearing (i.e., a roller bearing) that contains inside it a lubricant Y (for example, grease), and is formed as a radial bearing.

The bearing X of the present embodiment is provided with a toroidal outer ring X1 and a toroidal inner ring X2 that are positioned facing each other in a radial direction, a plurality of balls X3 that are located between the outer ring X1 and the inner ring X2, a holder X4 that is used to maintain equidistant intervals between adjacent balls X3, seals X5 that seal off the spaces where the balls X3 are housed, and a rotation angle indicator X6.

Note that in order to raise the visibility of the lubricant Y in the imaging data and to thereby acquire a more accurate distribution, it is desirable that component elements of the bearing X do not appear in the imaging data. Because of this, it is preferable for component elements of the bearing X (i.e., the outer ring X1, the inner ring X2, the balls X3, the holder X4, and the seals X5) to be formed from an aluminum material that has a low absorption rate of a neutron beam L1.

The bearing X of the present embodiment will be described below in detail, however, it is used by fixing the outer ring X1 while allowing the inner ring X2 to be driven to rotate. Namely, in the present embodiment, the inner ring X2 functions as a rotary motion body of the present invention that performs a rotary motion centered on its axis when the bearing X is being rotated.

In addition, the rotation angle indicator X6 is provided on the inner ring X2 that corresponds to the rotary motion body of the present invention.

The rotation angle indicator X6 is moved to a position that corresponds to the rotation angle of the inner ring X2 and, as is shown in FIGS. 1A through 1C, is formed by a first marker A, a second marker B, and a third marker C.

The first marker A, the second marker B, and the third marker C are formed from a material having a higher rate of neutron beam absorption than that of the inner ring X2 (i.e., a rubber material containing boron), and the shape thereof is set in a pin shape in the present embodiment.

In addition, as is shown in FIG. 1B, the first marker A and the second marker B are placed opposite each other around the center of movement (namely, around the central axis) of the inner ring X2 looking from an axial direction.

As is also shown in FIG. 1B, looking in the axial direction the third marker C is placed in a position that is offset 45° around the center of movement (i.e., around the central axis) of the inner ring X2 relative to the first marker A.

Moreover, as is shown in FIG. 1C, the first marker A is provided directly on the inner ring X2. In contrast to this, the second marker B and the third marker C are fixed to the inner ring X2 via spacers S that have mutually different heights in the axial direction.

In the present embodiment, the second marker B and the third marker C are fixed to the inner ring X2 via the spacers S. As a consequence, as is shown in FIG. 1C, looking from an orthogonal direction relative to the axial direction, the first marker A and the second marker B are offset from each other in the axial direction. Moreover, the third marker C is offset in the axial direction relative to the first marker A and the second marker B.

More specifically, the first marker A, the second marker B, and the third marker C are offset in the axial direction in the sequence of the first marker A, the third marker C, and the second marker B starting from the inner ring X2 side.

Note that the spacers S may also be formed from the same material as the first marker A, the second marker B, and the third marker C. It is preferable for the spacers S to be formed such that, when images are acquired from an orthogonal direction relative to the axial direction, images of all three of the first marker A, second marker B, and third marker C can be acquired irrespective of their position. Namely, it is preferable for the spacers S to be formed from a material that has a low neutron beam absorption rate (for example, from an aluminum material).

In the bearing X of the present embodiment that has the above-described structure, the placement of the first marker A, the second marker B, and the third marker C is rotationally asymmetrical when viewed from an axial direction. Because of this, the positions of the first marker A, the second marker B, and the third marker C as seen from the axial direction change in accordance with the rotation angle of the inner ring X2. Moreover, the placement pattern of the first marker A, the second marker B, and the third marker C as seen from an axial direction also changes in accordance with the rotation angle of the inner ring X2.

Moreover, in the bearing X of the present embodiment, the first marker A, the second marker B, and the third marker C are offset from each other in the axial direction when viewed from an orthogonal direction relative to the axial direction. Because of this, it is always possible to acquire an image of the first marker A, the second marker B, and the third marker C from an orthogonal direction relative to the axial direction.

Figure 2:
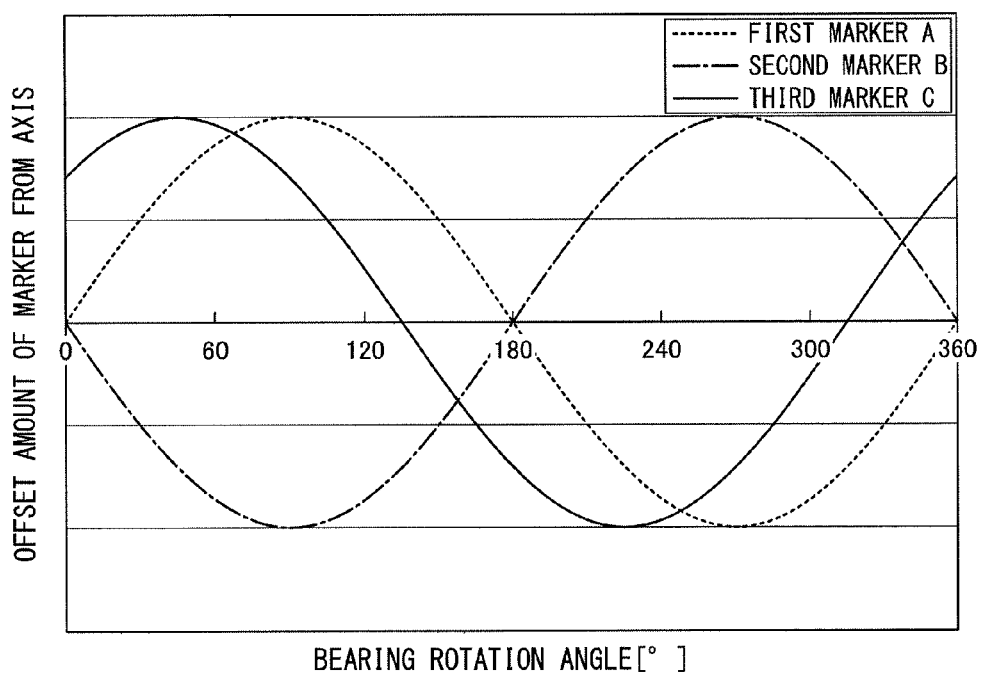
FIG. 2 is a graph showing a positional relationship between a first marker, a second marker, and a third marker that are provided on the bearing according to an embodiment of the present invention.

Moreover, the placements of the first marker A, the second marker B, and the third marker C are mutually asymmetrical relative to the central axis as seen from an orthogonal direction relative to the axial direction. Because of this, as is shown in FIG. 2, the amounts that each of the first marker A, the second marker B, the and the third marker C are offset from the central axis constantly change in accordance with the rotation angle of the inner ring X2. Moreover, the placement pattern of the first marker A, the second marker B, and the third marker C as viewed from an orthogonal direction relative to the axial direction also change in accordance with the rotation angle of the inner ring X2.

In other words, in the bearing X of the present embodiment, the positions of the first marker A, the second marker B, and the third marker C move in accordance with the rotation angle of the inner ring X2 both when viewed from the axial direction and when viewed from an orthogonal direction relative to the axial direction.

Because of this, by acquiring images of the bearing X from both the axial direction and from an orthogonal direction relative to the axial direction, it is possible to reliably ascertain the rotation angle of the inner ring X2.

Next, a lubricant distribution acquisition device and a lubricant distribution acquisition method that are used to ascertain the behavior of a lubricant Y inside the bearing X using the bearing X of the present embodiment will now be described with reference made to FIGS. 3A and 3B and FIG. 4.

Figure 3A:
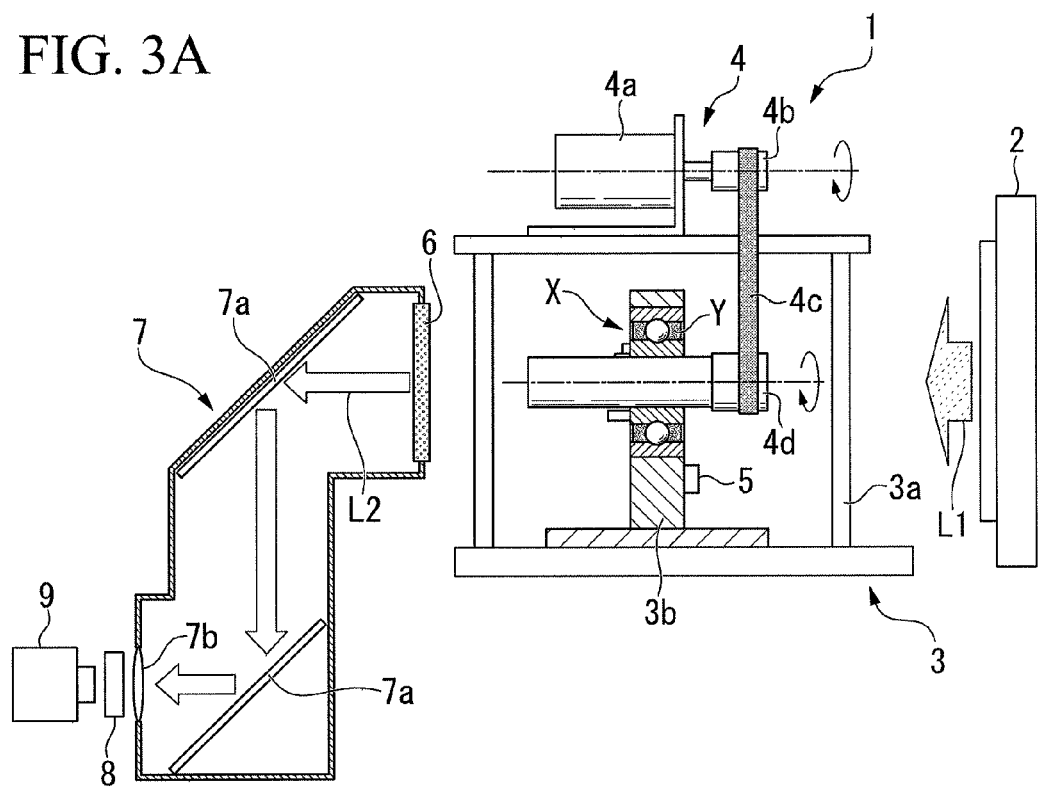
FIG. 3A is a schematic structural view of a lubricant distribution acquisition device that uses a bearing according to an embodiment of the present invention, and is a typical view showing a portion of the mechanism thereof
Figure 3B:
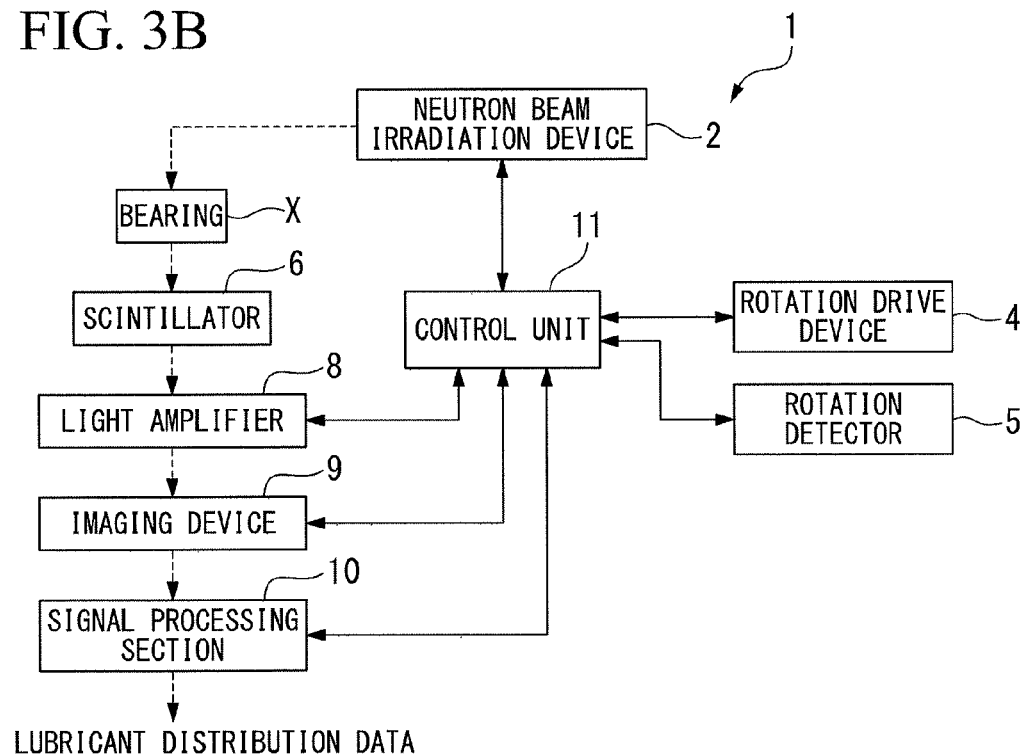
FIG. 3B is a schematic structural view of a lubricant distribution acquisition device that uses a bearing according to an embodiment of the present invention, and is a block diagram showing a portion of the functional structure thereof

FIGS. 3A and 3B show in typical form the schematic structure of a lubricant distribution acquisition device 1. FIG. 3A is a typical view showing a portion of the mechanism thereof. FIG. 3B is a block diagram showing a portion of the functional structure thereof.

In addition, as is shown in FIGS. 3A and 3B, the lubricant distribution acquisition device 1 is provided with a neutron beam irradiation device 2, a bearing support mechanism 3, a rotation drive device 4 (i.e., a rotation drive means), a rotation detector 5, a scintillator 6 (i.e., an electromagnetic wave converting means), a light guide mechanism 7, a light amplifier 8 (i.e., an electromagnetic wave amplifying means), an imaging device 9, a signal processing section 10, and a control unit 11.

The neutron beam irradiation device 2 guides a neutron beam L1 emitted from a neutron source such as, for example, an atomic reactor so as to irradiate it onto the bearing X from an axial direction.

Note that if it is possible to irradiate neutron beams emitted from the neutron source onto the bearing X from an axial direction without having to guide the neutron beams, then it is also possible to omit the neutron beam irradiation device 2.

Moreover, in the lubricant distribution acquisition device 1 of the present embodiment, it is also possible to provide a separate neutron source that generates neutron beams by irradiating ions of hydrogen or helium or the like that have been generated by an ion generator, for example, onto a target.

The bearing support mechanism 3 is used to support the bearing X, and is provided with a case body 3a and with a housing 3b.

The case body 3a is a frame body or box-shaped component that contains inside it the housing 3b and the bearing X that is fixed to the housing 3b. In the present embodiment, as is shown in FIG. 3A, the case body 3a also functions as a support base for the rotation drive device 4.

The housing 3b is used to cover and support the outer ring of the bearing X, and supports the bearing X such that the bearing X can be removably connected thereto. In addition, in the present embodiment, as is shown in FIG. 3A, the housing 3b supports the bearing X such that the main axis of the bearing X faces towards the neutron beam irradiation device 2 side.

Note that it is preferable for the case body 3a and the housing 3b to be shaped such that they avoid the transmission area of the neutron beam L1, however, if they are formed from an aluminum material or the like that has an extremely low neutron beam L1 absorption rate, then the case body 3a and the housing 3b may be shaped such that they span across the transmission area of the neutron beam L1.

The rotation drive device 4 is used to drive the bearing X to rotate. As is shown in FIG. 3A, the rotation drive device 4 is provided with a motor 4a (i.e., a motive power unit) that generates motive power for driving the bearing X to rotate, a pulley 4b that is used to transmit the motive power generated by the motor 4a to the bearing X by means of a belt, a belt 4c (i.e., a belt-shaped component), and a driveshaft portion 4d.

More specifically, the pulley 4b is joined by a coupling or the like to a shaft portion of the motor 4a. The driveshaft portion 4d is a rod-shaped component that is elongated in the axial direction of the bearing X. The driveshaft portion 4d is fixed to the inner ring of the bearing X, and is placed horizontally so as to penetrate the center of the bearing X. The belt 4c is formed by an endless belt, and is entrained around the pulley 4b and the driveshaft portion 4d.

Note that marks and magnetic objects that the rotation detector 5 uses to detect the state of rotation of the driveshaft portion 4d are provided on a circumferential surface of the driveshaft portion 4d.

The rotation detector 5 detects the rotation of the inner ring of the bearing X (namely, detects the rotation of the bearing X) that is fixed to the driveshaft portion 4d by detecting the rotation of the driveshaft portion 4d.

This rotation detector 5 is formed by an optical detector or a magnetic detector that detects the marks or magnetic bodies that are provided on the circumferential surface of the driveshaft portion 4d and, as is shown in FIG. 3A, is fixed to the housing 3b.

The scintillator 6 is used to receive the neutron beam L1 that is transmitted through the bearing X and then emit light L2, and converts the neutron beam L1 into visible light.

For example, LiF/ZnS (Ag), BN/ZnS (Ag), $Gd_2O_3$/ZnS (Ag), or $Gd_2O_3S$ (Tb) can be used for the scintillator 6.

The light guide mechanism 7 guides the light L2 emitted from the scintillator 6 to the imaging device 9 via the light amplifier 8.

As is shown in FIG. 3A, the light guide mechanism 7 is provided with a mirror 7a that reflects and guides the light L2, and with a lens 7b that condenses the light L2.

The light amplifier 8 is used to raise the intensity of the light that enters into it via the light guide mechanism 7, and to then output this light. For example, an image intensifier can be used for the light amplifier 8.

Note that if a sufficiently long exposure time can be guaranteed in the imaging device 9, then it is possible for the light amplifier 8 to be omitted.

The imaging device 9 is used to receive the light L2 that was emitted from the scintillator 6 and that arrived via the light guide mechanism 7 and the light amplifier 8, and then forms an image using this light. The imaging device 9 outputs the result of this imaging as imaging data.

Note that although a CCD camera, an SIT tube camera, or a high-speed camera or the like can be used for the imaging device 9, because the movement of the lubricant Y inside the bearing X that is rotating at a high speed of, for example, approximately 6000 rpm is extremely fast, it is preferable for a high-speed camera that is capable of obtaining images at an extremely high frame rate of approximately 2000 fps to be used.

The signal processing section 10 processes imaging data input from the imaging device 9, and outputs it as requested lubricant distribution data.

The lubricant distribution data referred to here is data that includes information pertaining to the distribution of a lubricant in a radial direction centered on the main axis, and information pertaining to the distribution of the lubricant in an axial direction. The signal processing section 10 of the present embodiment, for example, calculates lubricant distribution data from the brightness information in the imaging data, and performs processing to associate this lubricant distribution data with the detection results from the rotation detector 5.

Note that because the information pertaining to the distribution of a lubricant in a radial direction centered on the main axis, and information pertaining to the distribution of the lubricant in an axial direction are contained in the actual imaging data itself that was obtained by the imaging device 9, it is also possible for requested lubricant distribution data to be in the form of imaging data. In this case, the signal processing section 10 outputs the imaging data input from the imaging device 9 as lubricant distribution data without modifying it in any way.

Note that in the present embodiment, an imaging processing device of the present invention is formed by the imaging device 9 and the signal processing section 10.

The control unit 11 controls the overall operations of the lubricant distribution acquisition device 1 of the present embodiment. As is shown in FIG. 3B, the control unit 11 is electrically connected to the neutron beam irradiation device 2, the rotation drive device 4, the rotation detector 5, the light amplifier 8, the imaging device 9, and the signal processing section 10.

Next, operations (i.e., a lubricant distribution acquisition method) of the lubricant distribution acquisition device 1 of the present embodiment which is constructed in the manner described above will be described. Note that the main agent of the operations of the lubricant distribution acquisition device 1 of the present embodiment that are described below is the control unit 11.

Firstly, as is shown in FIG. 3A, the bearing X is set in a state in which the axial direction thereof faces towards the irradiation direction of the neutron beam L1. The control unit 11 then causes the bearing X to be rotated by the rotation drive device 4. As a result of this, the inner ring X2 of the bearing X is driven to rotate, and the balls X3 that are sandwiched between the inner ring X2 and the outer ring X1 revolve around the main axis at the same time as they are rotated around their own axis. As a consequence, the lubricant Y moves through the interior of the bearing X in conjunction with the movement of the balls X3.

Next, the neutron beam L1 is guided by the neutron beam irradiation device 2 so that, as is shown in FIG. 3A, the neutron beam L1 enters into the bearing X from the axial direction of the bearing X. Thereafter, the neutron beam L1 that has been transmitted through the bearing X enters into the scintillator 6.

When the neutron beam L1 enters into the scintillator 6, the scintillator 6 emits light the L2 that has the same intensity distribution as the intensity distribution of the neutron beam L1. Namely, the scintillator 6 converts the neutron beam L1 into the light L2 and then emits this light L2.

The light L2 emitted from the scintillator 6 is guided by the light guide mechanism 7 and amplified by the light amplifier 8, and then enters into the imaging device 9.

The control unit 11 then causes the imaging device 9 to create a plurality of images continuously. As a result of this, a plurality of sets of imaging data showing the bearing X from the axial direction is acquired by the imaging device 9.

Figure 4:
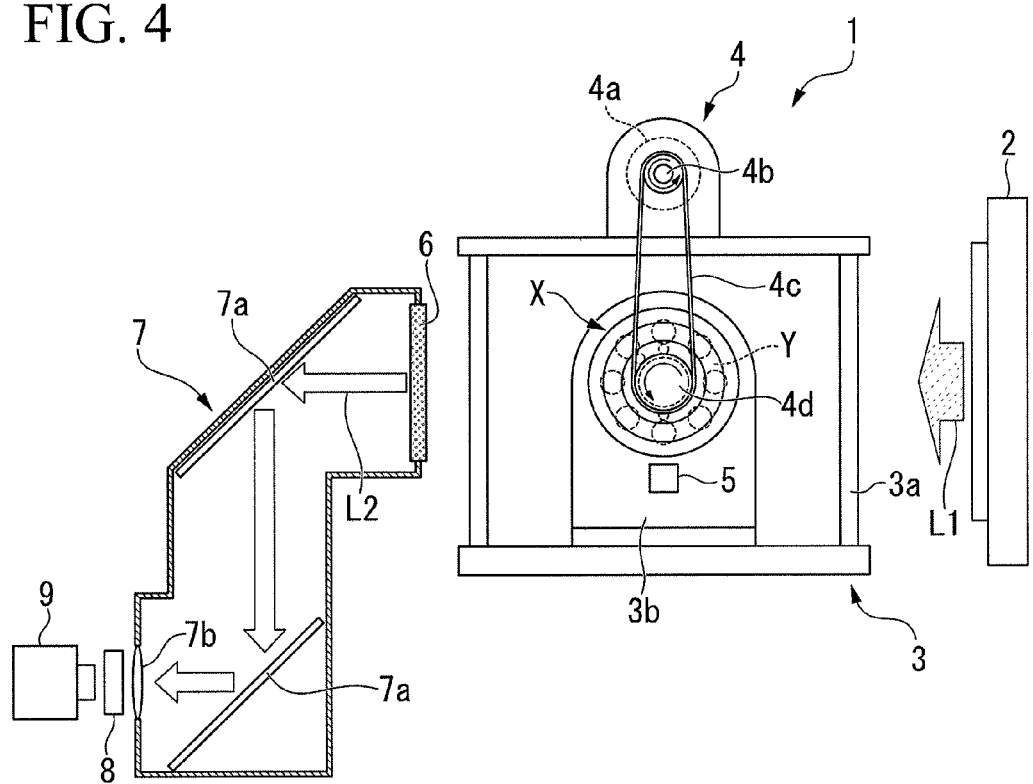
FIG. 4 is an explanatory view that is used to illustrate an operation of the lubricant distribution acquisition device that uses a bearing according to an embodiment of the present invention.

Next, as is shown in FIG. 4, the bearing X is set in a state in which the axial direction thereof faces in an orthogonal direction relative to the irradiation direction of the neutron beam L1.

Thereafter, by repeating the above-described operations, the control unit 11 causes the imaging device 9 to acquire a plurality of sets of imaging data showing the bearing X from an orthogonal direction relative to the axial direction.

Next, the control unit 11 causes the signal processing section 10 to process the imaging data, and to also calculate lubricant distribution data that includes information pertaining to the distribution of the lubricant in a radial direction around the main axis, and information pertaining to the thickness distribution of the lubricant in the axial direction.

The signal processing section 10 also performs processing to associate the calculated lubricant distribution data with the detection results from the rotation detector 5. As a result of this, the lubricant distribution data is output in association with the rotation angle of the bearing X.

The lubricant Y is formed from an organic material so that it has a higher rate of neutron beam absorption than does the bearing X. Because of this, the neutron beam L1 that has been transmitted through the bearing X is greatly attenuated in areas where the lubricant Y is present. In contrast, the intensity distribution of neutron beam L1 is proportional to the intensity distribution of the light L2 into which the neutron beam L1 has been converted.

Accordingly, by irradiating the neutron beam L1 onto the bearing X from the axial direction, and then acquiring images of the light L2 into which the neutron beam L1 that has been transmitted through the bearing X is converted, it is possible to acquire the distribution of the lubricant Y in a radial direction around the main axis, from the brightness distribution of the imaging data. Moreover, by irradiating the neutron beam L1 onto the bearing X from an orthogonal direction relative to the axial direction, and then acquiring images of the light L2 into which the neutron beam L1 that has been transmitted through the bearing X is converted, it is possible to acquire the distribution of the lubricant Y in the axial direction, from the brightness distribution of the imaging data.

In addition, in the lubricant distribution acquisition device 1 and the lubricant distribution acquisition method, by changing the neutron beam L1 that has been irradiated onto the bearing X from the axial direction and has been transmitted through the bearing X into the light L2, and then forming images from the received light L2, lubricant distribution data that shows the distribution of the lubricant Y inside the bearing X is acquired.

Because of this, according to the lubricant distribution acquisition device 1 and the lubricant distribution acquisition method, it is possible to acquire lubricant distribution data that includes the distribution of the lubricant Y in a radial direction around the main axis and also includes the thickness distribution of the lubricant Y in an axial direction without having to dismantle the bearing X. As a result, it is possible to ascertain in detail the behavior of the lubricant Y inside the bearing X.

Moreover, in the present embodiment, the signal processing section 10 acquires from the positions of the first marker A, the second marker B, and the third marker C, which are contained in the imaging data, lubrication distribution data by combining together sets of imaging data that were acquired with the rotation angle of the inner ring X2 in the same state.

By using the bearing X of the present embodiment, even if the imaging timings of the plurality of sets of imaging data are chronologically different, it is still possible to combine together sets of imaging data that were acquired when the rotation angle of the bearing X was in the same state. Accordingly, it is possible to accurately ascertain the behavior of the lubricant Y inside the bearing X.

Note that in the bearing X of the present embodiment, the rotation angle indicator X6 is provided on the inner ring X2. Because of this, even if there are temporary irregularities in the rotation speed of the bearing, or if there are changes due to elapsed time, it is still possible to accurately ascertain the rotation angle of the inner ring X2. As a result, it is possible to reliably combine together sets of imaging data that were acquired when the rotation angle of the inner ring X2 (namely, the bearing X) was in the same state.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

For example, in the above-described embodiment, a structure in which the outer ring X1 is fixed in the bearing X while the inner ring X2 is rotated is described.

However, the present invention is not limited to this and it is also possible to employ a structure in which the outer ring X1 is rotated while the inner ring X2 is fixed.

In this case, because the outer ring X1 functions as the rotary motion body of the present invention, the rotation angle indicator is provided on the outer ring X1.

Moreover, in the bearing X, when the bearing X is driven to rotate, the balls X3 revolve around the main axis. Namely, the balls X3 also function as the rotary motion body of the present invention.

Because of this, it is also possible to employ a structure in which the rotation angle indicator is provided on the balls X3.

In this case, it is also possible to employ a structure in which either all of or a portion of some of the balls X3 are formed from a material having a high neutron beam absorption rate that is different from that used to form the other balls X3 so that the balls X3 themselves can be used as the rotation angle indicator. The result of this is that it is no longer necessary to provide a rotation angle indicator as a separate object.

For example, in the rotation drive device, it is also possible to use a toothed pulley together with a toothed belt. It is also possible for a sprocket (i.e., a wheel portion) and a chain (i.e., a belt-shaped component) to be used.

Moreover, in the above-described embodiment, a structure in which the bearing X is a ball bearing that receives a load in a radial direction is described.

However, it is also possible for the present invention to be used to ascertain the behavior of a lubricant inside other types of bearing such as, for example, roller bearings, sliding bearings, and bearings that receive a load in a thrust direction.

Moreover, in the above-described embodiment, a structure in which the neutron beam L1 is transmitted through a bearing from an axial direction thereof is described.

However, the present invention is not limited to this and it is also possible for a structure in which the neutron beam L1 is transmitted through the bearing from an oblique direction relative to the main axis to be employed.

Moreover, in the above-described embodiment, a structure in which the neutron beam L1 is converted into light L2 using the scintillator 6 is described.

However, the present invention is not limited to this and it is also possible to acquire images by converting the neutron beam L1 into radioactive rays (i.e., electromagnetic waves) such as gamma rays and the like.

Moreover, in the above-described embodiments, a structure in which digital photography is performed by the imaging device 9 is described.

However, the present invention is not limited to this and it is also possible for film photography to be performed by the imaging device.

INDUSTRIAL APPLICABILITY

The bearing of the present invention is provided with a rotary motion body that moves when the bearing is driven to rotate. Because the rotary motion body moves in conjunction with the rotation of the bearing, the rotation angle of the rotary motion body is synchronized with the rotation angle of the bearing. Accordingly, by combining together sets of imaging data that were acquired with the rotation angle of the rotary motion body in the same state, sets of imaging data that were acquired with the rotation angle of the bearing in the same state can also be combined together.

In the bearing of the present invention, a rotation angle indicator that is moved in conjunction with the movement of the rotary motion body to a position that corresponds to the rotation angle of the rotary motion body is provided on the rotary motion body. Accordingly, by combining together sets of imaging data in which the position of the rotation angle indicator is the same, it is possible to combine together sets of imaging data that were acquired when the rotation angle of the rotary motion body (namely, the bearing) was in the same state even if the imaging timings of the plurality of sets of imaging data are chronologically different. As a result, according to the present invention, it is possible to accurately ascertain the behavior of a lubricant inside a bearing.

DESCRIPTION OF THE REFERENCE NUMERALS

X ... Bearing, X1 ... Outer ring, X2 ... Inner ring (Rotary motion body), X3 ... Balls, X4 ... Holder, X5 ... Seals, X6 ... Rotation angle indicator, A ... First marker, B ... Second marker, C ... Third marker, S ... Spacer, 1 ... Lubricant distribution acquisition device, 2 ... Neutron beam irradiation device, 4 ... Rotation drive device, 5 ... Rotation detector, 6 ... Scintillator (Electromagnetic wave converting means), 8 ... Light amplifier, 9 ... Imaging device, 10 ... Signal processing section, 11 ... Control unit, L1 ... Neutron beam, L2 ... Light (Electromagnetic waves), Y ... Lubricant

The invention claimed is:

1. A bearing inside which a lubricant is able to be sealed, comprising:
a rotary motion body that moves when a rotation drive force is applied; and
a rotation angle indicator that is provided on the rotary motion body and that is moved, in conjunction with the movement of the rotary motion body, to a position that corresponds to the rotation angle of the rotary motion body,
wherein both the position of the rotation angle indicator as seen from the axial direction of the bearing, and the position of the rotation angle indicator as seen from an orthogonal direction relative to the axial direction move in accordance with the rotation angle of the rotary motion body, and
the rotation angle indicator is formed by a first marker and a second marker that are formed from a material having a higher rate of radiation beam absorption than that used to form the rotary motion body.

2. The bearing according to claim 1, wherein
the first marker and the second marker are placed opposite each other when viewed from the axial direction around the center of movement of the rotary motion body, and are offset relative to each other in the axial direction when viewed from an orthogonal direction relative to the axial direction.

3. The bearing according to claim 2, wherein the rotation angle indicator is further provided with a third marker that is formed from a material having a higher rate of radiation beam absorption than that used to form the rotary motion body, and the third marker is offset in the axial direction relative to the first marker and the second marker when viewed from an orthogonal direction relative to the axial direction.

4. The bearing according to claim 3, wherein the third marker is placed in a position that is offset by a predetermined angle around the center of movement of the rotary motion body relative to the first marker or the second marker when viewed from the axial direction.

5. The bearing according to claim 4, wherein the predetermined angle is 45°.

6. The bearing according to claim 2, wherein the radiation beams are neutron beams.

7. The bearing according to claim 3, wherein the radiation beams are neutron beams.

8. The bearing according to claim 4, wherein the radiation beams are neutron beams.

9. The bearing according to claim 5, wherein the radiation beams are neutron beams.

10. A lubricant distribution acquisition device comprising:
an electromagnetic wave converting device that receives radiation beams that have been transmitted through the bearing described in claim 1, and converts these into electromagnetic waves; and
an imaging processing means that, by receiving the electromagnetic waves emitted from the electromagnetic wave converting device and using these electromagnetic waves to form images, acquires lubricant distribution data that shows the distribution of a lubricant inside the bearing.

11. The bearing according to claim 10, wherein the radiation beams are neutron beams.

12. A lubricant distribution acquisition method in which radiation beams that have been transmitted through the bearing described in claim 1 are converted into electromagnetic waves, and lubricant distribution data that shows the distribution of a lubricant inside the bearing is acquired by receiving the electromagnetic waves and using them to form images.

13. The lubricant distribution acquisition method according to claim 12, wherein the radiation beams are neutron beams.

* * * * *